(12) United States Patent
Hayabuchi et al.

(10) Patent No.: US 6,648,106 B2
(45) Date of Patent: Nov. 18, 2003

(54) ONE-WAY CLUTCH AND A SUPPORTING STRUCTURE

(75) Inventors: Masahiro Hayabuchi, Anjo (JP); Masaaki Nishida, Anjo (JP); Satoru Kasuya, Anjo (JP); Hiroshi Katou, Anjo (JP)

(73) Assignee: Aisin AW, Co., Ltd., Anjo (JP)

( * ) Notice: Subject to any disclaimer, the term of this patent is extended or adjusted under 35 U.S.C. 154(b) by 0 days.

(21) Appl. No.: 09/887,471

(22) Filed: Jun. 26, 2001

(65) Prior Publication Data

US 2002/0011385 A1 Jan. 31, 2002

(30) Foreign Application Priority Data

Jul. 28, 2000 (JP) ........................................ 2000-228101

(51) Int. Cl.$^7$ .......................... F16D 63/00; B25G 3/28; F16C 43/04
(52) U.S. Cl. ................. 188/82.1; 192/41 A; 403/359.6; 384/585
(58) Field of Search ............................... 188/82.1, 195, 188/205 R, 206 R, 82.74, 82.9; 192/45.1, 41 A; 475/8, 259, 281, 283, 285, 287, 289, 291, 292, 297, 307, 312, 318, 324; 403/359.1, 359.6; 384/585, 513

(56) References Cited

U.S. PATENT DOCUMENTS

| 2,683,509 | A | * | 7/1954 | Jandasek ................... 192/45.1 |
| 2,912,086 | A | * | 11/1959 | Troendly et al. ........... 192/45.1 |
| 3,800,927 | A | * | 4/1974 | Takata ......................... 192/45 |
| 4,222,472 | A | * | 9/1980 | Telford ........................ 192/36 |
| 4,240,679 | A | * | 12/1980 | Schnoll ....................... 384/465 |
| 4,770,054 | A | * | 9/1988 | Ha ............................. 192/223.2 |
| 4,792,028 | A | * | 12/1988 | Nishimura et al. ....... 192/41 A |
| 4,930,610 | A | * | 6/1990 | Akai et al. .............. 192/109 R |
| 5,201,645 | A | * | 4/1993 | Steele .......................... 418/14 |
| 5,320,204 | A | * | 6/1994 | Riggle et al. ........... 192/113.32 |
| 5,476,165 | A | * | 12/1995 | Awaji et al. ............. 188/82.84 |
| 5,511,642 | A | * | 4/1996 | Klotz et al. .................... 192/45 |
| 5,634,540 | A | * | 6/1997 | Awaji et al. ............. 188/82.84 |
| 5,928,104 | A | * | 7/1999 | Kimura et al. ............. 192/45.1 |
| 6,149,543 | A | * | 11/2000 | Breen ........................ 192/12 R |
| 6,277,047 | B1 | * | 8/2001 | Sato et al. ................... 475/144 |
| 6,409,001 | B1 | * | 6/2002 | Kerr ............................. 192/43 |

FOREIGN PATENT DOCUMENTS

| JP | 2278043 A | * | 11/1990 |
| JP | 10-231863 A | | 9/1998 |

* cited by examiner

*Primary Examiner*—Jack Lavinder
*Assistant Examiner*—Melody M. Burch
(74) *Attorney, Agent, or Firm*—Oliff & Berridge, PLC

(57) ABSTRACT

To ensure durability of a one-way clutch, by reducing surface pressures applied to side bearings, a one-way clutch has end bearings that are disposed between an outer race and an inner race and that maintain concentricity between the races. In a supporting structure wherein one of the outer race and the inner race is fitted to a stationary member and the other race is fitted to a rotational member, a clearance of a fitting portion between the stationary member and one of the races is narrower than a clearance between the rotational member and the other race. A load resulting from whirling of the rotational member is absorbed by the greater clearance, and a high load resulting from radial movements of the race fitted to the stationary member and a weight of the race is supported by the stationary member. Thus, loads applied to the end bearings are reduced.

21 Claims, 4 Drawing Sheets

ONE-WAY CLUTCH AND A SUPPORTING STRUCTURE

INCORPORATION BY REFERENCE

The disclosure of Japanese Patent Application No. 2000-228101 filed on Jul. 28, 2000 is incorporated herein by reference in its entirety.

BACKGROUND OF THE INVENTION

1. Field of Invention

The invention relates to a one-way clutch and, more particularly, to a supporting structure suited for mounting a one-way clutch to an automatic transmission.

2. Description of Related Art

A one-way clutch is constructed such that a number of lock members (sprags, rollers, and so on) supported by a retainer are disposed between an outer race and an inner race and that end bearings are disposed on opposed sides of the lock members so as to maintain concentricity between the races. A one-way clutch is used as a mechanical element for various purposes. In particular, in the case where a one-way clutch is employed in an automatic transmission as a means for engaging a rotational element of a planetary gear constituting a speed-change mechanism with a transmission case, a state of engagement with the transmission case can be canceled automatically through inversion of a torque applied to the rotational element, unlike the case with a wet multiple-disc frictional engagement element. Therefore, the one-way clutch is effective as an engagement means that is on the release side when performing a speed-change operation of engaging one of different rotational elements and releasing the other simultaneously.

Conventionally, as an example of structures wherein such a one-way clutch is installed in and supported by a transmission, there is an art disclosed in Japanese Patent Application Laid-Open No. HEI 10-231863. In this example, when an outer race and an inner race are fitted to and supported by a case and a rotational member respectively, a predetermined clearance is left in a fitting portion between the outer race and the case, and the inner race and the rotational member are closely fitted to each other with a narrow clearance. Thereby, radial movements (decentering caused by rotation and so on) resulting from whirling of the rotational member fitted to the inner race are finally absorbed by the clearance between the outer race and the case, as movements transmitted to the inner race, the end bearings and the outer race of the one-way clutch. Even if the inner race has moved radially due to whirling of the rotational member, normal operation of the one-way clutch is guaranteed.

However, according to the supporting structure of the above related art, the weight of the outer race as a non-rotational member is supported by the end bearings. Thus, especially if the case has been enlarged in diameter due to an increase in capacity of the transmission or the like and if the one-way clutch to be fitted to the case has been enlarged in diameter, the weight of the outer race is increased correspondingly. For this reason, surface pressures applied to the end bearings are increased. Furthermore, because the rotational member leading to a planetary gear is connected to the inner race with almost no play left therebetween, not only an inertia force of the inner race but also an inertia force resulting from radial whirling of other rotational members connected to the inner race is received by the end bearings. As a result, surface pressures applied to the end bearings are further increased.

SUMMARY OF THE INVENTION

In consideration of such circumstances, the invention mainly aims at providing a one-way clutch supporting structure capable of ensuring durability of the one-way clutch by reducing surface pressures applied to end bearings of the one-way clutch.

In order to solve the above problem, according to one aspect of the invention, there is provided a one-way clutch supporting structure wherein one of an outer race and an inner race of a one-way clutch having end bearings disposed between the outer race and the inner race is fitted to a stationary member, wherein the other race is fitted to a rotational member, and wherein a clearance of a fitting portion between the one of the races and the stationary member is narrower than a clearance of a fitting portion between the other race and the rotational member.

According to the above aspect of the invention, the clearance of the fitting portion of one of the outer race and the inner race that is connected to the stationary member is narrowed, and the permanently stationary one of the races is prevented from being displaced greatly by the stationary member so that great radial loads are prevented from being applied to the end bearings. Therefore, surface pressures applied to the end bearings can be reduced, and durability of the one-way clutch is improved. Further, because radial movements of the rotational member fitted to the other race are absorbed by the clearance of the fitting portion to be fitted to the other race, a radial inertia force that is applied to the rotational member is not applied to the other race. Therefore, surface pressures applied to the end bearings can be reduced, and durability of the one-way clutch is improved.

In the above structure, it is more advantageous that the one of the races be radially supported by the stationary member while abutting thereon. In this structure, one of the races is radially supported by the stationary member while abutting thereon, whereby the weight of the one of the races as well as a radial load applied thereto is supported by the stationary member. Therefore, surface pressures applied to the end bearings can further be reduced.

Further, in the above structure, it is more advantageous that the one of the races be the outer race and that the other race be the inner race. In this structure, the end bearings are located peripherally inwardly of the outer race and, thus, have only to support the inner race having a small mass. Therefore, surface pressures applied to the end bearings can further be reduced.

Further, in the above structure, it is also advantageous that the fitting portion of the one of the races to be fitted to the stationary member be fixed at opposed ends thereof by snap rings. In this structure, the fitting portion between the one of the races and the stationary member is fixed at axial both ends thereof by the snap rings, whereby the one of the races is prevented from being inclined. Therefore, surface pressures applied to the end bearings can further be reduced.

Further, in the above structure, it is also advantageous that the one of the races be spline-fitted to the stationary member and that a bottom portion of a spline of the one of the races abut on a top portion of a spline of the stationary member. In this structure, the abutment portion between the one of the races and the stationary member requires high precision for the sake of close fitting. On the side of the stationary member, the top portion is provided on the spline. Thus, nothing more than cutting the top portion, that is easy to process, is required. Therefore, the man-hours necessary for processing the case can be reduced.

Further, in the above structure, the inner race may have an oil passage for supplying the end bearings with lubricating oil.

In this structure, because sliding surfaces of the end bearings can be reliably supplied with lubricating oil, durability of the one-way clutch is improved.

BRIEF DESCRIPTION OF THE DRAWINGS

The objects, features, advantages, technical and industrial significance of the invention will be better understood by reading the following detailed description of preferred embodiments of the invention, when considered in connection with the accompanying drawings, in which:

Hereinafter, embodiments of the invention will be described with reference to the drawings. FIG. 1 is a partial, half-cut, side sectional view of an automatic transmission to which a one-way clutch and a supporting structure according to a first embodiment of the invention is applied. As shown in FIG. 1, a one-way clutch is constructed such that a number of lock members (sprags, rollers, and so on) 4 supported by a retainer 3 are disposed between an outer race 1 and an inner race 2 and that end bearings 5A, 5B are disposed on opposed sides of the lock members 4 so as to maintain concentricity between the races 1, 2. One of the outer race 1 and the inner race 2 (the outer race 1 in this embodiment) is fitted to a case of an automatic transmission as a stationary member 8. The other race (the inner race 2 in this embodiment) is fitted to a carrier shaft of a planetary gear (not shown) as a rotational member 9.

According to the feature of the invention, a radial clearance of a fitting portion between the outer race 1, as one of the races, and the case 8 of the transmission (FIG. 2A) is narrower than a radial clearance of a fitting portion between the inner race 2, as the other race, and the rotational member 9 (FIG. 2B). FIGS. 2A and 2B are partial sectional views that extend in a direction perpendicular to the axis and show, by contrast, the fitting portion between the outer race 1 and the case 8 (FIG. 2A) and the fitting portion between the inner race 2 and the rotational mentor 9 (FIG. 2B). In this embodiment, the outer race 1 is spline-fitted to the case 8. That is, a bottom portion 11 of a spline 10 of the outer race 1 abuts on a top portion 81 of a spline 80 of the case 8. Thus, the outer race 1 is radially supported by the case 8 while abutting thereon, and the radial clearance of the fitting portion is substantially eliminated.

As shown in FIG. 1, a fitting portion 1c of the outer race 1 to be fitted to the case 8 is fixed at axial both ends thereof by a snap ring 6 that is fitted close to an end of the spline 80 of the case 8 and a snap ring 7 that is fitted between the fitting portion 1c and a separator plate of a frictional engagement element (not shown) and that also serves as axial displacement restricting means for the separator plate. Furthermore, the inner race 2 has an oil passage 21 for supplying the end bearings 5A, 5B with lubricating oil.

For more detail, as shown in FIG. 1, the outer race 1 is extended to the fitting portion 1c, to be fitted to the case 8, via an annular portion 1a that has an intrinsically required radial thickness and an extended portion 1b that consists of an inclined flange to fix the annular portion 1a to an inner periphery of the case 8 at an axially offset position. As a whole, the outer race 1 is a relatively large component with its radial dimension greater than its axial length. As shown in FIG. 2A, the spline 10 with rectangular teeth is provided on an outer periphery of the fitting portion 1c. The teeth of the spline 10 are obtained by cutting an outer peripheral surface of a forged material and thus are easy to process. Therefore, the bottom portion 11 is finished with precision into a surface abutting on the top portion 81 of the spline 80 of the case 8. On the other hand, as the spline 80 of the case 8 is obtained by processing an inner peripheral surface of a spline that has been die-cast and that has a draft angle, it is especially difficult to finish the bottom side with precision. Therefore, the top portion 81 that can be lathed is finished with precision into a surface abutting on the bottom portion 11 of the spline 10 of the outer race 1.

For more detail, as shown in FIG. 1, the outer race 1 is extended to the fitting portion 1c, to be fitted to the case 8, via an annular portion 1a that has an intrinsically required radial thickness and an extended portion 1b that consists of an inclined flange to fix the annular portion la to an inner periphery of the case 8 at an axially offset position. As a whole, the outer race 1 is a relatively large component with its radial dimension greater than its axial length. As shown in FIG. 2A, the spline 10 with rectangular teeth is provided on an outer periphery of the fitting portion 1c. The teeth of the spline 10 are obtained by cutting an outer peripheral surface of a forged material and thus are easy to process. Therefore, the bottom portion 11 is finished with precision into a surface abutting on the top portion 81 of the spline 80 of the case 8. On the other hand, as the spline 80 of the case 8 is obtained by processing an inner peripheral surface of a spline that has been die-cast and that has a draft angle, it is especially difficult to finish the bottom side with precision. Therefore, the top portion 81 that can be lathed is finished with precision into a surface abutting on the bottom portion 11 of the spline 10 of the outer race 1.

On the other hand, the inner race 2 (FIG. 2B) is directly fitted to an outer periphery of the rotational member 9 that is in the shape of a hollow shaft and thus consists only of an annular portion that has a required radial thickness. The inner race 2 is slightly extended in both axial directions, so that one outer peripheral side of the inner race 2 constitutes a margin as a surface for supporting the end bearing 5A and that the other outer peripheral side of the inner race 2 constitutes a stopper abutting on an adjacent member. An oil groove 22 that is deeper than grooves of a spline 20 is formed circumferentially in an axially substantially central portion of an inner peripheral surface of the annular portion, so as to allow oil to be supplied from a lubricating oil passage in the rotational member 9 that is fitted on an inner peripheral side of the annular portion. Three oil passages 21, 23 are formed in such a manner as to extend radially from a bottom of the oil groove 22. The central oil passage 23, that extends radially and perpendicularly to the axis, is designed to supply the lock members 4 with oil. The oil passages 21 that extend radially and diagonally with respect to the axis are designed to supply oil to sliding surfaces between inner peripheral surfaces of the end bearings 5A, 5B and an outer peripheral surface of the inner race 2. The inner peripheral spline 20, which is divided by the oil groove 22 into two parts that are axially aligned with each other for connection with the rotational member 9, is formed in the inner peripheral surface of the inner race 2. As shown in FIG. 2B, the spline 20 has involute teeth and is fitted to a similarly configured outer peripheral spline 90 of the rotational member 9, with a predetermined clearance maintained therebetween both radially and circumferentially.

Figure 1:
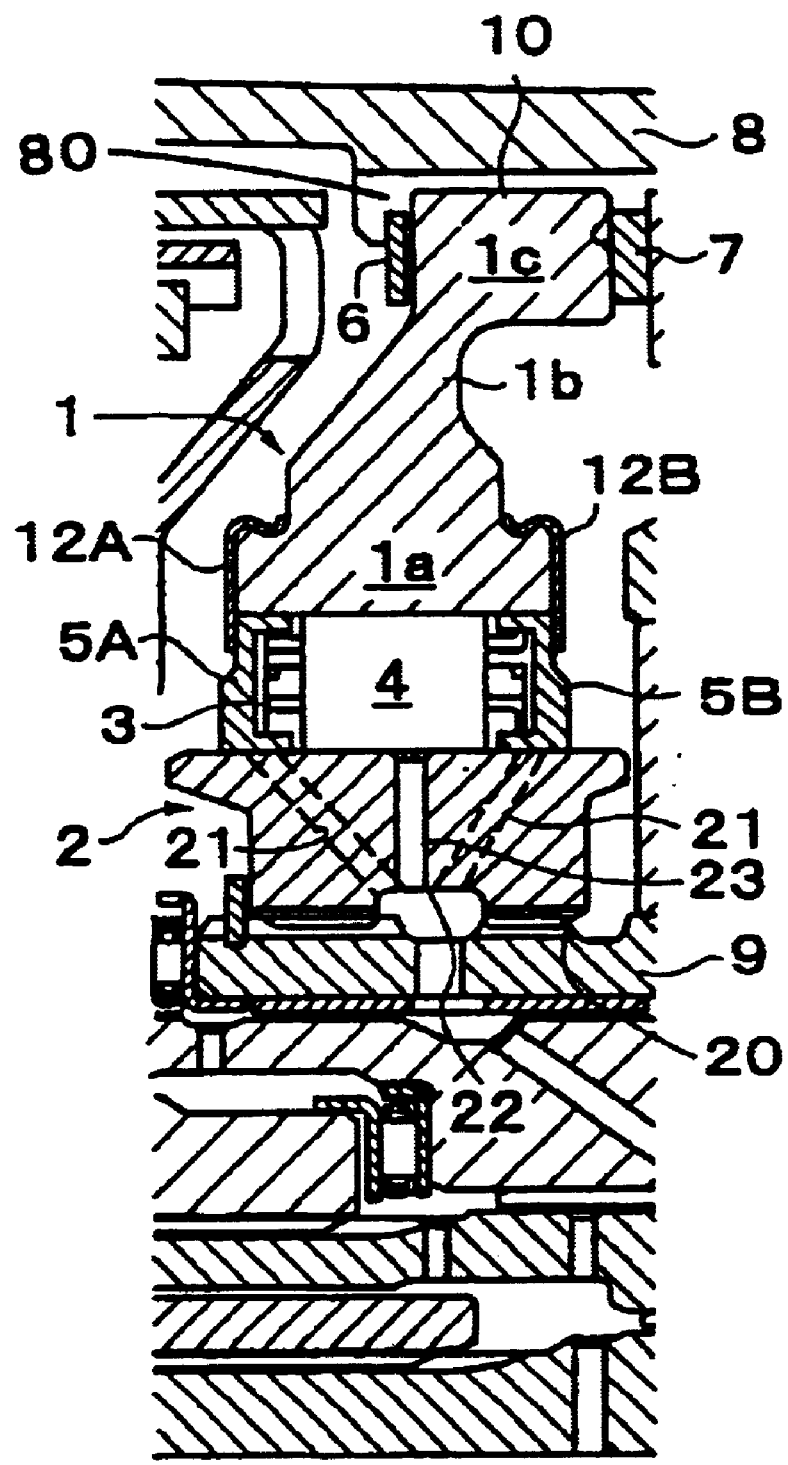
FIG. 1 is a partial, half-cut, side sectional view of an automatic transmission to which a one-way clutch supporting structure according to a first embodiment of the invention is applied.

In a supporting structure thus structured, the clearance of the fitting portion of one of the outer race 1 and the inner race 2 that is connected to the case 8 is reduced. By reducing the clearance between the outer race 1 and the permanently stationary case 8, the outer race 1 is prevented from being displaced greatly. Therefore, application of a great radial load to the end bearings 5A, 5B is prevented, and thus surface pressures applied to the end bearings 5A, 5B can be reduced. Thereby durability of the one-way clutch is improved. Further, because the clearance of the fitting portion between the rotational member 9 and the inner race 2 absorbs radial movements of the rotational member 9 that is fitted to the inner race 2, a radial inertia force acting on the rotational member 9 does not act on the inner race 2. Thus, surface pressures applied to the end bearings 5A, 5B can be reduced, and durability of the one-way clutch is improved.

Further, the clearance of the fitting portion between the outer race 1 and the case 8 is substantially eliminated, whereby the weight of the outer race 1 as well as a radial load applied thereto is supported by the case 8 via an abutment portion of the spline. Therefore, surface pressures applied to the end bearings 5A, 5B can further be reduced. Moreover, the end bearings 5A, 5B are located peripherally inwardly of the outer race 1 and thus have only to support the inner race 2 having a small mass. Therefore, surface pressures applied to the end bearings 5A, 5B can further be reduced.

Further, the fitting portion of the outer race 1 to be fitted to the case 8 is fixed at axial both ends thereof by the snap rings 6, 7, whereby the outer race 1 that has a radial dimension greater than an axial length thereof and that thus tends to be inclined is prevented from becoming inclined. Thus, this structure also serves to reduce surface pressures applied to the end bearings 5A, 5B. In the embodiment shown in the drawings, the snap rings 6, 7 are both in the shape of a flat plate. However, by adopting a structure wherein at least one of the snap rings 6, 7 is a tapered snap ring so that the clearance between the fitting portion 1c of the outer race 1 and the snap rings 6, 7 is eliminated, the effect of preventing inclination can be further improved.

Further, the abutment portion between the outer race 1 and the case 8 requires high precision for the sake of close fitting. On the side of the case 8, the top portion 81 is provided on the spline 80. Thus, nothing more than cutting the top portion 81, that is easy to process, is required. Therefore, the man-hours for processing the case 8 can be reduced.

Further, the oil groove 22 that is deeper than the spline grooves, is provided in the inner race 2 that is fitted to the rotational member 9, and is in communication with the oil passage 21 for supplying lubricating oil. Thus, the oil groove 22 serves as an oil sump and the rotational member 9 rotates, whereby the sliding surfaces of the end bearings 5A, 5B can be reliably supplied with lubricating oil due to a centrifugal force when great loads are applied to the end bearings 5A, 5B. Therefore, durability of the one-way clutch is improved.

The first embodiment adopts a structure wherein the outer race 1 is fitted to the stationary member 8 and wherein the inner race 2 is fitted to the rotational member 9. However, this arrangement can be reversed. Next, a second embodiment of the invention adopting such an arrangement will be described.

Figure 3:
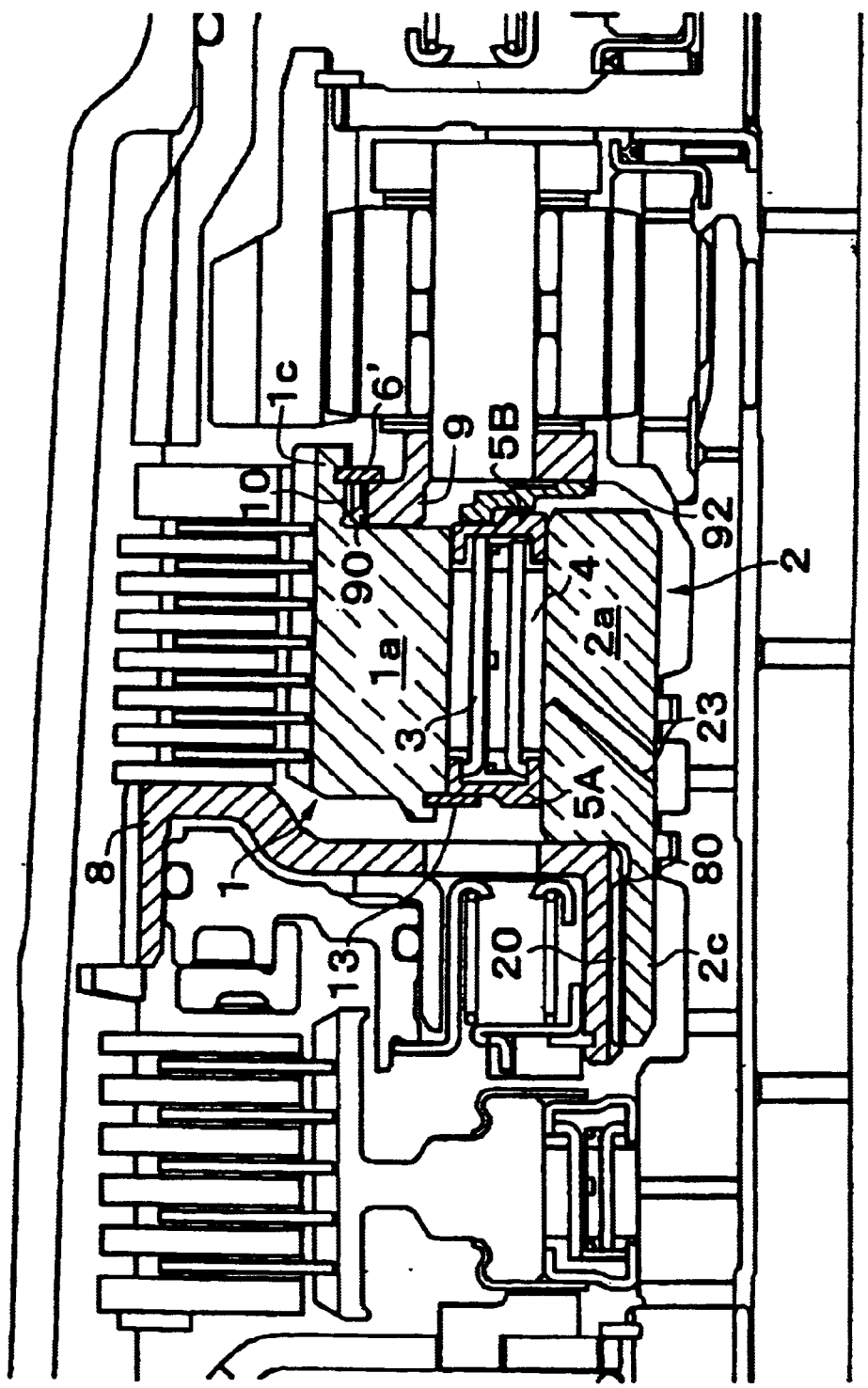
FIG. 3 is a partial, half-cut, side sectional view according to a second embodiment of the invention, showing a part similar to the part shown in FIG. 1.

FIG. 3 is a partial, half-cut, side sectional view of an automatic transmission to which a one-way clutch supporting structure according to a second embodiment of the invention is applied. As shown in FIG. 3, in this embodiment, the inner race 2 of the one-way clutch is fitted to the stationary member 8, i.e., a cylinder of a hydraulic servo fixed to a case of a transmission. The outer race 1, that also serves as a hub of a brake, is fitted to a carrier flange of a planetary gear set as the rotational member 9. Also in this case, a clearance of a fitting portion between the inner race 2 and the cylinder 8 as the stationary member is narrower than a clearance of a fitting portion between the outer race 1 and the carrier flange as the rotational member 9.

Figure 2A:
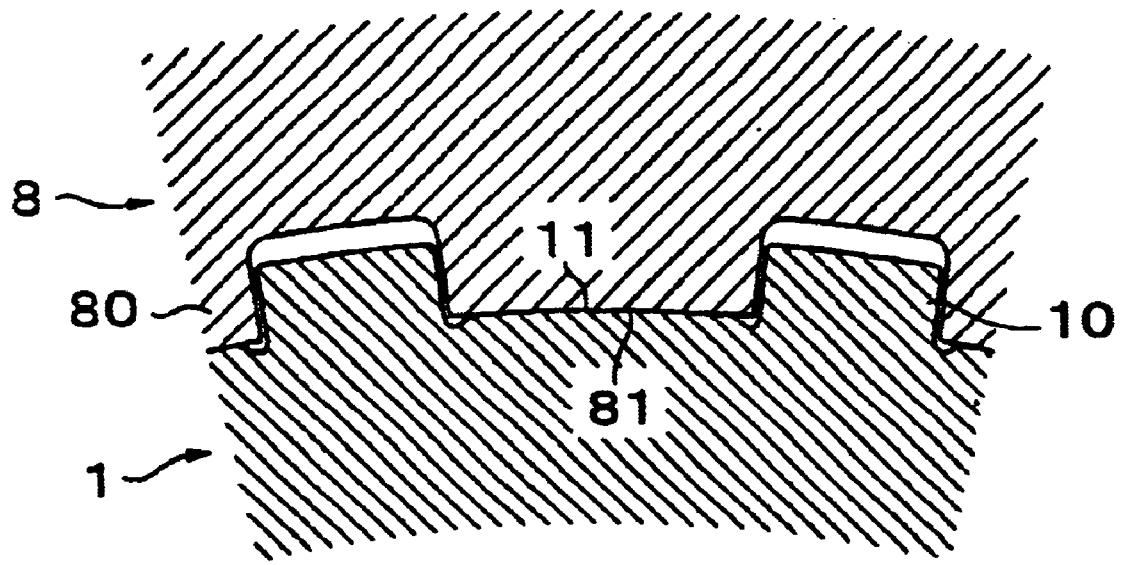
FIGS. 2A and 2B are partial, sectional views that extend in a direction perpendicular to the axis and that show a fitting portion between an outer race and a stationary member and a fitting portion between an inner race and a rotational member, respectively.
Figure 2B:
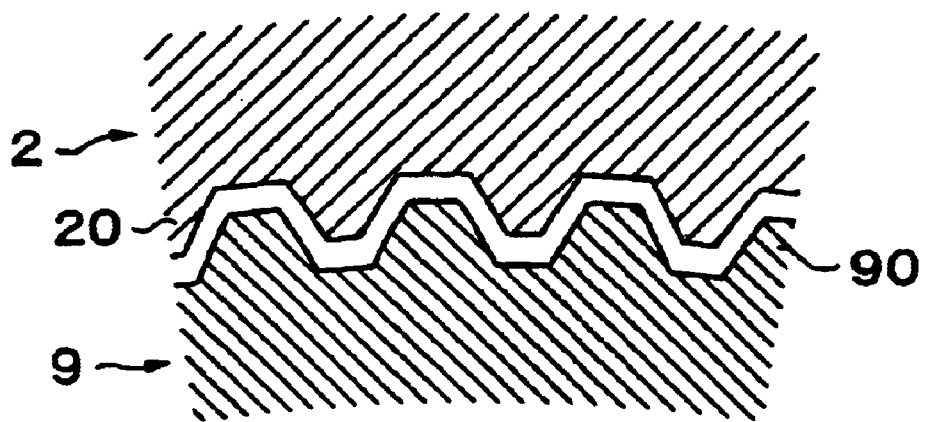

For more detail, the outer race 1 is constructed only of an annular portion 1a with no radially extended portion and also serves as the hub of the brake. Thus, the outer race 1 is a relatively large component having a great axial length. The fitting portion 1c of the outer race 1 is a portion extending in one axial direction from an outer peripheral side of the annular portion 1a. A spline that has top and bottom teeth, as is the case with the fitting portion to be fitted to the rotational member according to the first embodiment shown in FIG. 2, is provided on an inner periphery of the fitting portion 1c. In the second embodiment, a spline that axially slidably supports a frictional member of the brake is formed on an outer peripheral surface of the outer race 1. Axial movements of the outer race 1 are restricted by abutment on the carrier flange that is interposed between the snap ring 6' fitted to an annular groove crossing the spline 10 and an end surface of the outer race 1.

The inner race 2 is fitted to an inner peripheral surface of a hollow shaft portion of the cylinder of the hydraulic servo, and thus has a fitting portion 2c that extends toward one axial side from an inner peripheral side of the annular portion 2a having a required radial thickness. The spline 20 is formed on the outer peripheral surface of the inner race 2. In this case, as is the case with the fitting portion to be fitted to the stationary member according to the first embodiment shown in FIG. 2, the spline 20 has rectangular teeth. The teeth of the spline 20 are obtained by cutting an outer peripheral surface of a forged material and thus are easy to process. Therefore, the bottom side is finished with precision into a surface abutting on the top portion of the spline 80 of the cylinder. On the other hand, because the spline 80 of the cylinder of the hydraulic servo is obtained by processing an inner peripheral surface, the top side, which can be finished with precision more easily than the bottom side, is finished with precision into a surface abutting on the bottom of the spline 20 of the inner race 2. In the case of this arrangement, in order to allow oil to be supplied from the lubricating oil groove in the rotational member passing through the inner peripheral side of the inner race 2, the oil passage 23 that extends radially and diagonally with respect to the axis is provided in the annular portion 2a to supply the lock members 4 with oil.

Also in this case, as is the case with the first embodiment, in order to reduce costs, identically configured annular members of a U-shaped cross-section are disposed facing each other with the retainer 3 interposed therebetween, thus constituting the end bearings 5A, 5B. The inner peripheral surfaces of the end bearings 5A, 5B are in slidable contact with the outer peripheral surface of the inner race 2, and the outer peripheral surfaces of the end bearings 5A, 5B are in slidable contact with the inner peripheral surface of the outer race 1. The end bearings 5A, 5B have inner surfaces abutting on the retainer 3 and thus are prevented from being displaced inwards. Moreover, the end bearings 5A, 5B are prevented from being displaced outwards by a snap ring 13 fitted to the inner peripheral side of the outer race 1 and a stopper 92 fixed to the carrier flange.

Also in the second embodiment thus structured, the clearance of the fitting portion of the inner race 2, connected to the stationary member 8, is reduced, and great radial movements of the permanently stationary inner race 2 are supported by the stationary member 8. Thus, great radial loads are prevented from being applied to the end bearings 5A, 5B, and surface pressures applied to the end bearings are reduced. Therefore, durability of the one-way clutch is improved. Further, because radial movements of the carrier flange 9 fitted to the outer race 1 are absorbed by the clearance between the spline 10 and the spline 90 in the fitting portion between the outer race 1 and the carrier flange 9. Therefore, a radial inertia force that is applied to the carrier flange is not applied to the outer race 1, and surface pressures applied to the end bearings 5A, 5B can be reduced. As a result, durability of the one-way clutch is improved.

Further, if the clearance of the fitting portion between the inner race 2 and the cylinder 8 of the hydraulic servo is substantially eliminated, the weight of the inner race 2 as well as a radial load applied to the inner race 2 is supported by the cylinder 8. Thus, surface pressures applied to the end bearings 5A, 5B can be further reduced.

Figure 4:
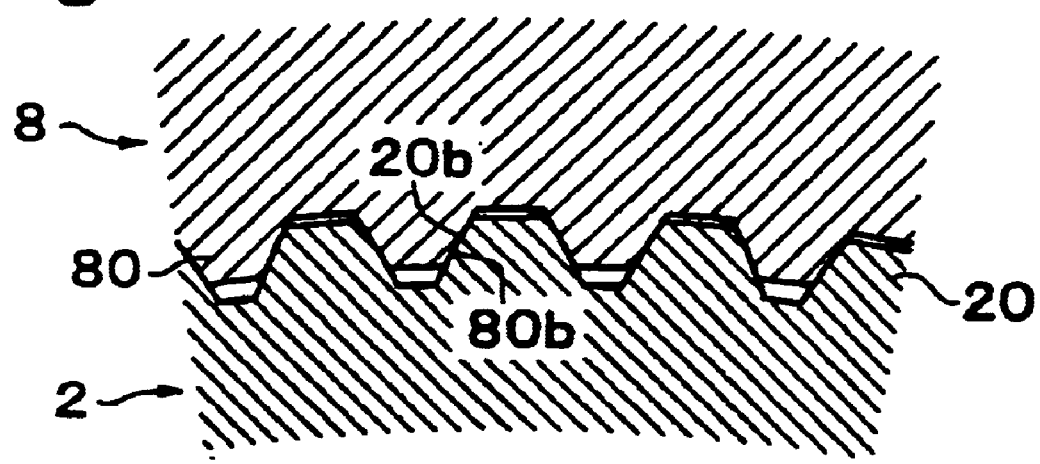
FIG. 4 is a partial, sectional view that extends in a direction perpendicular to the axis and that shows a variant of a spline-fitting portion between a stationary member and an inner race of the one-way clutch of the second embodiment.

Further, the abutment portion between the inner race 2 and the stationary-member (cylinder) 8 requires high precision for the sake of close fitting. On the side of the stationary-member (cylinder) 8, the top portion is provided on the spline 80. Thus, nothing more than cutting the top portion, that is easy to process, is required. Therefore, the man-hours for processing the cylinder 8 can be reduced. In this embodiment, the spline 20 of the inner race 2 has rectangular teeth as is the case with the fitting portion to be fitted to the stationary member of the first embodiment shown in FIG. 2. However, the spline 20 and the spline 80 of the hydraulic servo cylinder may have involute teeth as shown in FIG. 4, and side surfaces 20b, 80b of the involute teeth may abut on each other. In this case, by broaching the spline 20 of the inner race 2 and processing the spline 80 of the hydraulic servo cylinder by means of a hob or a gear shaper, high processing precision can be ensured relatively easily.

Although the invention has been described in detail based on two embodiments thereof, it can be realized in other various modes. Further, the invention is applicable not only to automatic transmissions but also to other various apparatuses. However, the invention can be especially advantageously applied to an automatic transmission structured such that a shaft supporting span has been increased due to elimination of a center support and that strong whirling of a rotational member is thereby inevitably produced.

Although the invention has been described with reference to preferred embodiments thereof, it is to be understood that the invention is not limited to the preferred embodiments or structures. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A one-way clutch and a supporting structure, comprising:
    an inner race;
    an outer race; and
    at least one end bearing disposed between the outer race and the inner race, wherein
        one race of the outer race and the inner race of the one-way clutch is fitted to a stationary member, the other race is fitted to a rotational member, and a radial clearance of a fitting portion between a spline bottom surface of the one race and a spline top surface of the stationary member is narrower than a radial clearance of a fitting portion between a spline bottom surface of the other race and a spline top surface of the rotational member to reduce surface pressure to the at least one end bearing, the other race and the rotational member are fitted so as to substantially not rotate relative to one another, wherein the supporting structure comprises the stationary member and the rotational member.

2. The one-way clutch and the supporting structure according to claim 1, wherein the one race is radially supported by the stationary member while abutting thereon.

3. The one-way clutch and the supporting structure according to claim 2, wherein the one race is the outer race and the other race is the inner race.

4. The one-way clutch and the supporting structure according to claim 3, wherein the fitting portion of the one race to be fitted to the stationary member is fixed at both axial ends thereof by snap rings.

5. The one-way clutch and the supporting structure according to claim 4, wherein the one race is spline-fitted to the stationary member and a bottom portion of a spline of the one race abuts on a top portion of a spline of the stationary member.

6. The one-way clutch and the supporting structure according to claim 5, wherein the inner race has an oil passage for supplying the at least one end bearing with lubricating oil.

7. The one-way clutch and the supporting structure according to claim 3, wherein the one race is spline-fitted 10 the stationary member and wherein a bottom, recessed portion of a spline of the one race abuts on a top, extended portion of a spline of the stationary member.

8. The one-way clutch and the supporting structure according to claim 3, wherein the inner race has an oil passage for supplying the at least one end bearing with lubricating oil.

9. The one-way clutch and, the supporting structure according to claim 2, wherein the one race is spline-fitted to the stationary member and wherein a bottom, recessed portion of a spline of the one race abuts on a top, extended portion of a spume of the stationary member.

10. The one-way clutch and the supporting structure according to claim 1, wherein the one race is the outer race and the other race is the inner race.

11. The one-way clutch and the supporting structure according to claim 10, wherein the fitting portion of the one race to be fitted to the stationary member is fixed at both axial ends thereof by snap rings.

12. The one-way clutch and the supporting structure according to claim 10, wherein the one race is spline-fitted to the stationary member and a bottom, recessed portion of a spline of the one race abuts on a top, extended portion of a spline of the stationary member.

13. The one-way clutch and the supporting structure according to claim 10, further comprising end bearings between the outer race and the inner race, wherein the inner race has an oil passage for supplying the end bearings with lubricating oil.

14. The one-way clutch and the supporting structure according to claim 1, wherein tile fitting portion of the one race to be fitted to the stationary member is fixed at both axial ends thereof by snap rings.

15. The one-way clutch and the supporting structure according to claim 1, wherein the inner race has an oil passage for supplying the at least one end bearing with lubricating oil.

16. A one-way clutch and a supporting structure, comprising:
    an inner race;
    an outer race;
    a stationary member;
    a rotation member; and
    a bearing mechanism between the inner race and the outer race, wherein one of the inner race and the outer race is spline fitted to the stationary member such that a spline top surface of the stationary member is in contact with a spline groove bottom surface of the one of the inner race and the outer race and the other of the inner race and the outer race is loosely spline fitted to the rotation member to absorb radial movements of the rotation member and to substantially prevent relative rotation between the the other of the inner race and the outer race and the rotation member and to reduce surface pressure to the bearing mechanism, wherein the supporting structure comprises the stationary member and the rotation member.

17. The one-way clutch and the supporting structure according to claim 16, further comprising a snap ring at at least one end of the outer race.

18. The one-way clutch and the supporting structure according to claim 16, further comprising at least one oil passage through the inner race.

19. The one-way clutch and the supporting structure according to claim 16, wherein the inner race is engaged with the stationary member.

20. The one-way clutch and the supporting structure according to claim 16, wherein the outer race is engaged with the stationary member.

21. The one-way clutch and the supporting structure according to claim 1, wherein the other race and the rotational member are fitted by spline having a predetermined clearance therebetween both radially and circumferentially.

* * * * *